July 8, 1924.

H. A. SÉVIGNÉ

LOCKED ADJUSTABLE DEVICE

Filed March 2, 1923

1,500,901

INVENTOR
HENRI A. SÉVIGNÉ
BY
ATTORNEY

Patented July 8, 1924.

1,500,901

UNITED STATES PATENT OFFICE.

HENRI A. SÉVIGNÉ, OF WINTHROP, MASSACHUSETTS, ASSIGNOR TO SECURITY ENGINEERS INCORPORATED, OF LOWELL, MASSACHUSETTS, A CORPORATION OF MASSACHUSETTS.

LOCKED ADJUSTABLE DEVICE.

Application filed March 2, 1923. Serial No. 622,288.

*To all whom it may concern:*

Be it known that I, HENRI A. SÉVIGNÉ, a citizen of the United States, and resident of Winthrop, in the county of Suffolk and State of Massachusetts, have invented certain new and useful Improvements in Locked Adjustable Devices, of which the following is a specification.

This invention relates to devices for firmly securing in properly adjusted cooperative relationship, two members such as a valve and its seat, or the two runways of a ball or roller bearing.

Many and in fact most valve structures require occasional adjustments to secure proper seating of the valves. Such adjustments may be necessary not only when the parts are being assembled but also later to compensate for wear. And in many antifriction bearings one or the other of the opposing tracks or runways for the balls or rolls requires occasional adjustment to enable said balls or rolls to travel with the correct degree of freedom.

Heretofore it has been customary to employ cooperating male and female threaded members to provide for such adjustments as above mentioned, and to employ a supplemental device such as a jam nut to be set tightly against the female member to hold it firmly in its adjusted position. Jam nuts are not reliable, especially when employed in machines which operate at high speed or in which vibrations exist during operation, such as the motors of automobiles, and in spinning machines. Valves are necessary parts of automobiles, and ball or roller bearings are necessary parts of spinning and other machines.

Besides the possibility of failure of a jam nut to hold parts securely is the objection that the setting of the female threaded member and of the jam nut requires two operations. And even then it is difficult if not impossible to secure a fine accurate adjustment because if the female threaded member is set just right the forcing of the jam nut against it is liable to change that setting. Since the two can never be simultaneously set in accurate secured position, a final operation of the jam nut alone is necessary.

The object of this invention is to provide an improvement in threaded adjustment devices whereby the usual jam nut can be dispensed with without affecting the ability of the male and female members to retain their relative positions during operation of the machine of which said adjustment device forms a part.

With this object in view, my invention consists in a female member of a screw-threaded adjusting coupling, so constructed that it, as a single member, can be moved to any point along the coacting male member, and will remain there, whether set in contact with some other member or not, and which can not be dislodged from its set position without employing a tool and a very considerable amount of tool-actuating force.

Of the accompanying drawings which illustrate my invention applied to one of the several uses to which it may be put:—

Similar reference characters indicate similar parts in all of the views.

Figure 1:
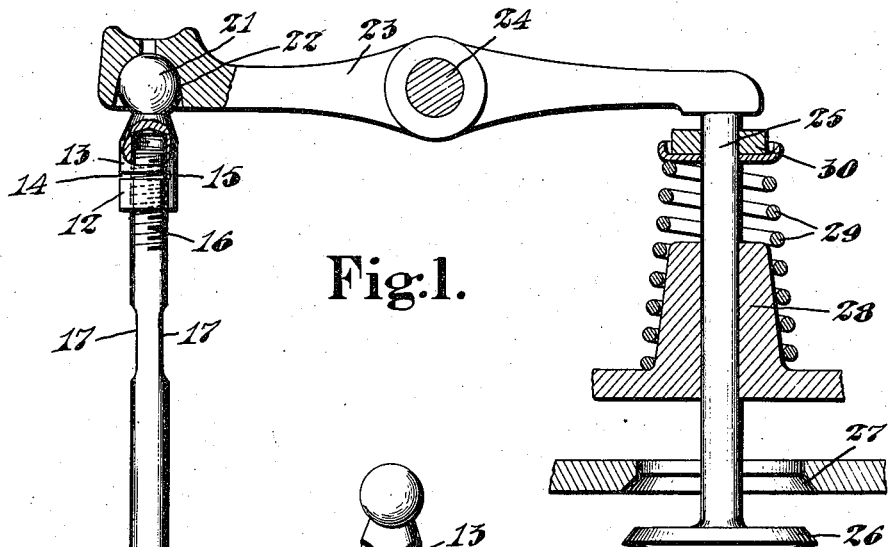
Figure 1 is a side elevation of a valve mechanism having my improved screw-threaded adjusting coupling.
Figure 2:
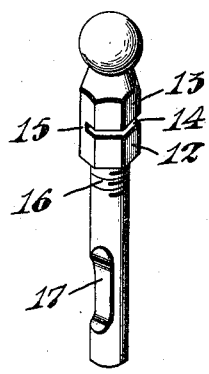
Figure 2 is a perspective view of the coupling illustrated in Figure 1.

The female member of the coupling is illustrated as having an external polygonal surface to enable it to be conveniently grasped and operated by a wrench. It is partially divided by a slot 14 to present portions 12, 13, connected by an integral portion 15. It is internally threaded to engage the threaded portion of a male member 16 which is preferably so formed that some part of it can be conveniently grasped and operated by a wrench. Suitable flattened portions 17 may serve this purpose.

Figure 3:
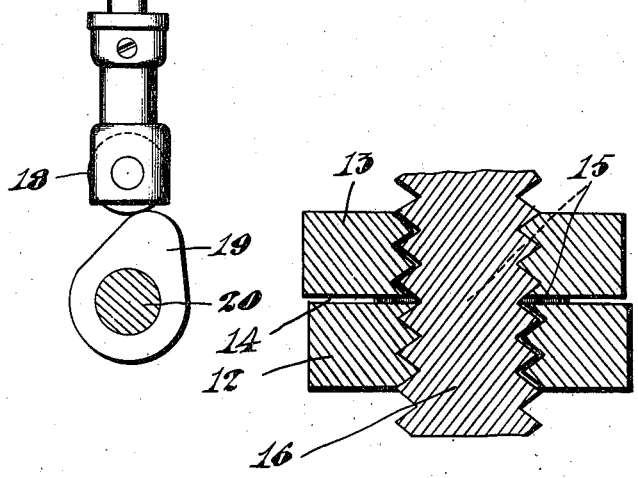
Figure 3 is a sectional view, on a larger scale than the other figures, to illustrate the gripping action of the female member.

The female member is distorted so that its internal threads will automatically grip the threaded portion of the male member. In the embodiment of the invention illustrated such distortion is effected by slightly altering the relative positions of the two portions 12, 13, as by laterally off-setting one relatively to the other as indicated in Figure 3. The result is that the internal threads of the portion 12 grip both the upper and lower inclined surfaces of the threads of the male member on one side while the internal threads of the portion 13 grip both the upper and lower inclined surfaces of the threads of the male member on the opposite side. In other words there is an inward pressure of the female member against opposite sides of the male member. The portions of the male member which receive this pressure, however, are not directly opposite each other but are at different distances longitudinally of the male member so as to increase the gripping action.

In operation, the female member can be moved by a wrench to any point longitudinally of the threaded portion of the male member with great accuracy, and will remain there without setting it up against anything or employing a secondary jam nut to bear against it. Of course if the male member is not so mounted that it can not turn, it must be held from turning during such adjustment of the female member. This may be by a wrench engaging the flat surfaces 17.

Referring to Figure 1 which illustrates my improved coupling as a part of a valve-actuating mechanism, the male member comprises a rod or stem having a roll 18 at its lower end actuated by a cam 19 carried by a shaft 20. The female member has a ball-shaped upper end 21 fitting a socket or recess 22 in one end of a lever 23 pivotally supported at 24. The other end of the lever bears on the upper end of the stem 25 of the valve 26 which cooperates with a valve seat 27, said stem being guided in a suitable bearing 28. A spring 29 exerts an upward pressure against a collar 30 secured to the valve stem, said spring acting to close the valve on its seat when permitted to do so by the cam 19. In said Figure 1 the size of the cam and the degree of opening of the valve are exaggerated in the interest of clearness of illustration. When it is desired to make an adjustment to effect proper seating and opening of the valve, it is only necessary to vary the effective length of the member which transmits motion from the cam 19 to the lever 23, doing this by rotating the female member 12, 13, relatively to the male member 16. As hereinbefore explained, the adjustment is easily effected and when made it is practically an automatically locked adjustment.

Owing to the fact that the portions 12, 13, in the embodiment of the invention illustrated, are relatively offset laterally, any tool employed for turning the female member on the male member tends to bring those portions into alinement while being operated by said tool and therefore frictional binding of the threads is reduced during such operation. Upon removal of the tool the said portions are urged, by the integral neck 15, to return to their normal offset condition, with the result that there is such frictional grip upon both sides of the threads of opposite portions of the male member 16 as to successfully resist any loosening whatever from the set or adjusted position except upon the application of considerable force applied externally and rotatively to the female member.

While I have found in practice that the slotted and offset female member illustrated and described is effective, I do not limit myself to such specific method of effecting distortion of the threads to cause the female member to automatically grip the male member.

Having now described my invention, I claim:—

1. A device of the character described comprising male and female threaded members for the purpose of transmitting motion from one to the other, said members coacting in effecting and maintaining a variation in the length of said device, one of said members having some of its threads displaced relatively to its other threads to cause the threads of the two members to bind in interengaged relationship without requiring any additional agency to effect the binding action.

2. A device for securing in proper cooperative relative positions two relatively movable mechanical elements, said device comprising a threaded male member and a threaded female member combined for the purpose of transmitting motion from one to the other, some of the threads of the female member being permanently displaced relatively to others to possess an inherent automatic tendency to grip the male member.

3. An automatically-locking adjusting device for maintaining proper cooperative relationship of two relatively movable members, said device comprising a threaded male member and a threaded female member mounted on the male member for the purpose of transmitting motion from one to the other, the female member having some of its threads displaced relatively to others to automatically grip said male member without requiring any additional agency to effect the gripping action.

4. A device for securing in proper cooperative relative positions two relatively movable mechanical elements, said device comprising a threaded male member and a threaded female member combined for the purpose of transmitting motion from one to the other, some of the threads of the female member being displaced relatively to others to automatically grip the male member without requiring any additional agency to effect the gripping action, said male and female members having portions adapted to be engaged by wrenches to enable one to be rotated relatively to the other.

5. A device of the character described comprising male and female threaded members for the purpose of transmitting motion from one to the other, said members coacting in effecting and maintaining a variation in the length of said device, some of the threads of the female member being displaced in planes parallel to such threads to effect a binding action on the threads of the male member.

In testimony whereof I have affixed my signature.

HENRI A. SÉVIGNÉ.